March 28, 1950  O. R. SWEENEY ET AL  2,501,880
SOLVENT EXTRACTION APPARATUS AND PROCESS
Filed Aug. 30, 1946  2 Sheets-Sheet 2
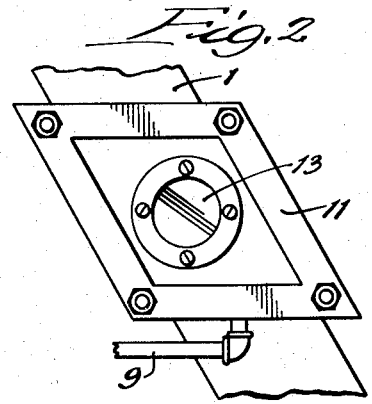
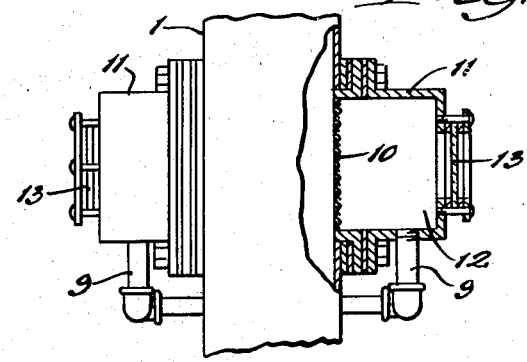
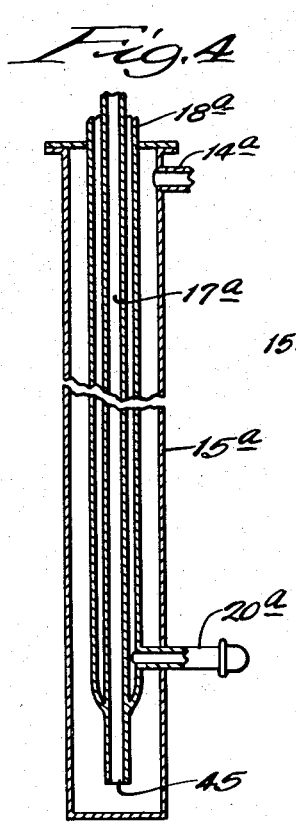
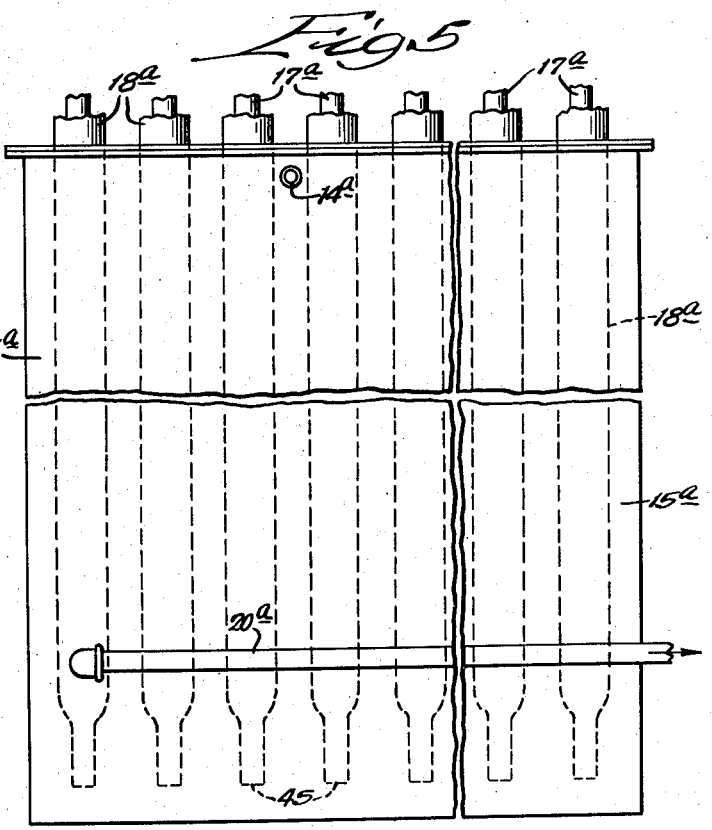
Inventors:
Orland R. Sweeney
and Lionel K. Arnold,
By Dawson, Orth and Spangenberg,
Attorneys Patented Mar. 28, 1950

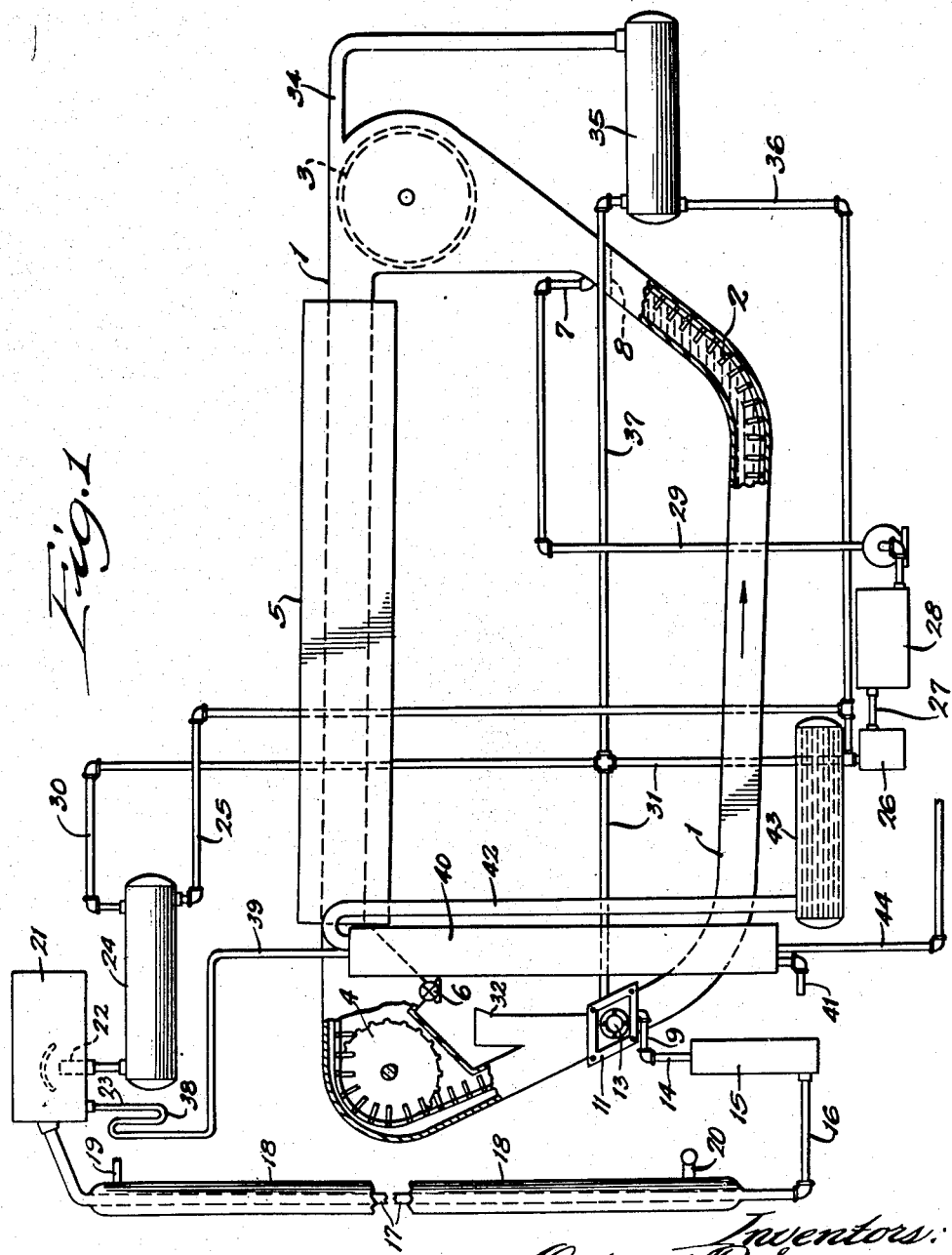

2,501,880

UNITED STATES PATENT OFFICE 2,501,880

SOLVENT EXTRACTION APPARATUS AND PROCESS

Orland R. Sweeney and Lionel K. Arnold, Ames, Iowa, assignors to Iowa State College Research Foundation, Ames, Iowa, a corporation of Iowa Application August 30, 1946, Serial No. 694,138

3 Claims. (Cl. 260—412.8)

This invention relates to a solvent extraction apparatus and process. It is particularly useful in the extraction of oil from soy beans, cottonseed, hashed meat, and other oil-bearing materials, by means of a volatile solvent, etc.

In the extraction of oil through the use of a volatile solvent from flaked, hashed, or comminuted material, great difficulty is experienced in separating the oil from the comminuted, etc. material. As the oil-bearing solvent is withdrawn, the comminuted material tends to press against the screen or sieve and packs around the interstices so as to prevent the free flow of the solvent and oil. To meet the situation, often a larger size of screen is employed than is desirable, and this allows a greater quantity of the comminuted material to escape. Further, in the separation of the solvent, there is difficulty in preventing the oil from being scorched or otherwise damaged by heat employed in the evaporation of solvent. Other difficulties are experienced when the process is carried on continuously and it is attempted to separate the solvent by continuous process from the oil.

An object of the present invention is to overcome the above difficulties, to provide an efficient method of continuously separating the solvent from the oil without scorching of the oil or damaging the same by heat, while at the same time providing effective means for producing flow of the oil and solvent through the screen. A further object is to provide a process and apparatus in which the vaporizing of the solvent is employed as an effective means for exerting back pressure upon the screen to free it of the comminuted or flaked material packed thereon and thus to produce free flow of the solvent and oil. Yet another object is to provide apparatus wherein a jacketed tube is employed in combination with a buffer tank for the effective treatment of varying quantities of oil and solvent, thus rendering the apparatus foolproof and efficient for different feed rates. Yet another object is to provide apparatus in which unusually fine mesh screen or close-woven filter cloths may be employed and wherein back pressure impulses are employed for keeping the filter screens or cloths substantially unclogged. Other specific objects and advantages will appear as the specification proceeds.

The invention is illustrated, in preferred embodiments, by the accompanying drawings, in which—

Figure 1 is a side view in elevation of apparatus embodying our invention, a portion of the conduit being broken away and shown in section; Fig. 2, a side view in elevation on an enlarged scale of the filter apparatus employed; Fig. 3, a front view in elevation of the filter apparatus shown in Fig. 2, a portion of the structure being broken away and shown in section; Fig. 4, a vertical sectional view of a jacketed pipe supported within a sealed chamber and constituting a modified form of structure embodying our invention; and Fig. 5, a broken side view in elevation of the structure shown in Fig. 4.

In the illustration given in Figs. 1 to 3 inclusive, 1 designates a conduit in which is mounted an endless conveyor 2. The endless conveyor passes over an idler sprocket wheel 3 at one end and over a driving sprocket wheel 4 at the other end. The conduit is provided with a heating or drying casing 5 enclosing the conduit 1 at its upper horizontal part and to which a heating medium, such as steam or heated air, may be supplied. The conduit 1 is also provided with a valve-controlled outlet 6 through which the dried flaked material, comminuted material, etc., may be withdrawn. The apparatus is described in greater detail in our co-pending application Serial No. 543,942 and now Patent No. 2,497,700 for Extraction apparatus and process.

The conduit 1 is substantially U-shape in contour but somewhat tilted to the right so that the lowermost portion of the conduit is at the right side of the lower leg. Solvent is introduced into the lower leg of the conduit 1 through the inlet pipe 7 and the liquid level is maintained within the apparatus as indicated by the dotted line 8.

Solvent is withdrawn through outlet pipes 9 at the side of the leg opposite inlet 7 by allowing the solvent and oil to overflow through a screen, filter cloth, or any other suitable sieving means. As shown more clearly in Figs. 2 and 3, the conduit 1 is provided with a pair of screens 10 on each side thereof, and a casing 11 provides a withdrawal or overflow chamber 12 at each side of the screen. If desired, the casing 11 may be provided with a sight glass 13 through which the action of the screen may be observed. The withdrawal pipes 9 communicate with each of the overflow chambers 12 and are united by couplings with a single vertical pipe 14 which extends into a buffer tank 15. The buffer tank 15 is connected by pipe 16 with a jacketed pipe 17. The jacket 18 enclosing pipe 17 is closed at either end and is provided with pipes 19 and 20 for conducting a heating fluid to and from the jacket. If a heating material, such as Dowtherm, or heavy petroleum oil is used, the heated material may be introduced at the top of the jacket through pipe 19 and drawn off at the bottom through pipe 20, the withdrawn heating material being then recirculated through the heating element. If steam is used to heat the pipe, the steam may be introduced through the top pipe and a steam trap tap used for drawing off the condensed vapor at the bottom of the jacket. It will be understood that any suitable heating means may be employed as desired. The vertical pipe 17 discharges into a surge tank 21 which is provided with a vapor draw-off pipe 22 and a liquid draw-off pipe 23. The surge tank 21 may be provided with baffles or any suitable means for freeing the vapor or entrained liquid and to cause the liquid to collect at the bottom of the tank.

Vapor flows out of surge tank 21 through the vapor pipe 22 and into the condenser 24. The condensate flows through pipe 25 to the storage vessel 26. The storage vessel 26 may be provided with any suitable means for separating any water which is carried into the system and is volatilized with the solvent. For example, if a solvent, such as trichloroethylene or methylene chloride, is employed and is heavier than water, then water may be drawn off from the top of tank 26, while if a solvent lighter than water, such as hexane or benzene, is employed, the water may be drawn off through a suitable draw-off pipe from the bottom of vessel 26. Solvent is withdrawn from vessel 26 through pipe 27 and into the reservoir 28 from which it is pumped through line 29 to the inlet pipe 7.

Uncondensed vapors from the condenser 24 may pass through the pipe 30 to a pipe 31 which enters the conduit 1 just below the feed hopper 32. The pipe 31 communicates through pipe 33 with the vessel 26.

Solvent vapors are withdrawn from the conduit 1 adjacent the heating or drying chamber 5 through the feeder outlet pipe 34 and are led to a condenser 35. From the condenser 35, condensate passes through the pipe 36 to the vessel 26, while uncondensed vapors pass through pipe 37 to the pipe 31.

The vaporizing pipe 17 and the surge tank 21 are effective at times for separating fairly completely the solvent from the oil. Under many conditions, however, the pipe 17 and surge chamber 21 are not capable of such complete separation and the oil-containing solvent passes through outlet pipe 23, trap 38, and pipe 39 to the stripper 40. The stripper 40 may be of any suitable type of structure and in the illustration given consists of a column which may be packed with suitable materials, such as Raschig rings, Beryl saddles, or the like. Steam is introduced into the bottom of the column through pipe 41, and the residual solvent is volatilized and passes out through down pipe 42 to the condenser 43. From the condenser, the condensate flows downwardly into vessel 26 while unvolatilized material may pass upwardly through pipe 31. The oil recovered from the process passes out of stripper 40 through pipe 44 to storage or to further processing equipment.

*Operation*

In the operation of the apparatus and process, flaked, hashed, or otherwise comminuted material to be extracted, is fed into the conduit 1 through the hopper 32. It travels downwardly through the conduit in the direction of the arrow toward the inlet pipe 7 and is carried countercurrent to the flow of the solvent by means of the conveyor 2. The solvent enters the conduit through pipe 7 and travels toward the overflow outlet pipes 9.

Any suitable solvent may be employed which is capable of being volatilized at temperatures well below the decomposition point of the oil or fat to be extracted.

The solvent and extracted oil pass outwardly through the screen 10 into overflow chambers 12 and thence outwardly through pipes 9 to the down pipe 14. The buffer chamber 15 receives the overflowing liquid and causes a column of oil and solvent to build up within the vertical pipe 17 and within the heated jacket 18.

The heat being transmitted from the jacket 18 causes the upper portion of the solvent body to flash into vapor and this causes a slug of oil and vapor to rapidly travel up to 17 and erupt into surge tank 21. Here the slug surges against the baffles and the liquid is drained into the bottom of the tank. The bulk of the solvent which is now a vapor goes through outlet pipe 22 into condenser 24 and back through pipe 25 to vessel 26. From vessel 26, the solvent is drawn off into reservoir 28 from which it is pumped back into the system through inlet pipe 7.

The oil within surge tank 21 and residual solvent contained therein flows out through pipes 23, trap 38, and line 39 to the stripper 40. In the stripper 40 the residual solvent travels down over the packing material and is volatilized, the vapor passing down pipe 42 to condenser 43. The oil is recovered through pipe 44.

When the heat within the jacket 18 causes the vaporization of a portion of the solvent and a slug of oil and vapor travels up, a pressure stroke in the liquid is produced in the opposite direction, with the result that liquid is forced upwardly through the vessel 15, pipe 14, outlet pipes 9, and overflow chambers 12, thus producing a pressure impulse against the outside of the screen and moving the solution and the material being extracted away from the inside of the screen momentarily. Then as the pressure reduces, due to the slug of oil passing into the surge tank 21, the solution rushes back through the screen. This churning up-and-down movement in vessel 15 and the connecting pipes between it and the screen cause a pulsating pressure against the screen, tending to keep it clean and permitting the free flow of solvent and oil therethrough. By means of this intermittent clearing of the screen, we are able to use very fine mesh screens and even close-woven filter cloths.

Another advantage of the apparatus employed is that the rapid movement of the slug of oil over the hot surface while producing efficient heat transfer, at the same time prevents the oil from being scorched or otherwise damaged by the heat.

Another advantage of the apparatus is that the tank 15 serves as a buffer or control in the operation of the process. If the apparatus for a short time delivers a rush of solution, the head in tank 15 rises, causing more liquid to enter the pipe 17. In 17, more slugs form, and consequently the apparatus can be operated with a considerable variation of solution in the extraction process. This flexibility of the apparatus is further increased by the use of the stripper 40 which takes care of any increased percentage of solvent carried by the outgoing oil in pipe 23.

If desired, a filter may be introduced in the line 39. However, because of the increased effectiveness of the screen 10 as a result of the churning action caused by vaporizing solvent in pipe 17, a finer mesh screen may be used, and there is less need for a filter in pipe 39; successful operations can be carried on with no filter at all at this point.

The jacketed pipe 17 is highly efficient in separating liquid from liquid, and at certain feed rates is capable of effective separation of the solvent from the oil so that within the surge tank 21 oil containing substantially no solvent may be withdrawn through pipe 23.

It will be noted that solvent running into vessel 15 is at practically atmospheric pressure, and no pump is employed for forcing the solvent and oil into the pipe 17. The free communication between the pipe 17 and the overflow chambers makes possible the effective clearing of the screen 10 within each of the chambers.

In the modification shown in Figs. 4 and 5, a plurality of pipes 17ª are supported within a closed and airtight tank 15ª. The bottom end of each of the pipes 17ª is open at 45 so that it is in communication with the interior of tank 15ª. The pipe 14ª leading from the overflow chambers carries the solvent and oil to the tank 15ª.

Enclosing each of the pipes 17ª is a jacket 18ª. A heating fluid is supplied to each of the jackets 18ª by an inlet pipe not shown, and an outlet pipe 20ª communicates with each of the jackets 18ª near the lower end thereof.

In the modification shown in Figs. 4 and 5, the tank 15ª is the equivalent of tank 15 and it receives directly within it the pipe 17ª corresponding to pipes 17 in the structure shown in Fig. 1. In the structure shown in Figs. 4 and 5, it will be noted that the jackets 18ª not only serve to heat the liquid within pipe 17ª, but also they preheat the oil and solvent within tank 15ª. By adjusting the jackets 18ª and pipes 17ª vertically within the tank 15ª, the extent of the preheating can be controlled. The modification is useful also in that the quantity of throughput can be considerably increased through the employment of the multiple units in a single tank 15ª.

While in the foregoing specification, we have set forth specific details for the purpose of illustrating embodiments of the invention, it will be understood that such details may be varied widely by those skilled in the art without departing from the spirit of our invention.

We claim:

1. In a process in which solvent and oil is withdrawn through a screen from an extraction zone and solvent evaporated, the steps of providing an elongated vertical vaporizing zone, providing a liquid column of solvent and oil between said vaporizing zone and said screen, vaporizing solvent in said zone to carry slugs of oil upwardly through the vaporizing zone and to create pressure impulses against said liquid column to force said liquid over said screen to clear the same, and separating the liquid and vapors discharged from said vaporizing zone.

2. In a process in which solvent and oil is withdrawn through a screen from an extraction zone and solvent evaporated, the steps of maintaining an elongated vertical vaporizing zone, providing a liquid column of solvent and oil between said vaporizing zone and said screen, supplying heat to said vaporizing zone to force upwardly slugs of solvent and oil while creating back pressure impulses against said column whereby liquid from said column is forced against said screen to clear the same, and separating the vapor from the liquid passing out of said vaporizing zone, and condensing vapors withdrawn.

3. A countercurrent extraction vessel having an inlet for solvent at one end of the zone of countercurrent contact of solvent with the material to be extracted and an outlet for solvent at the other end of said zone, a screen surrounding said outlet, a downwardly-extending uninterrupted conduit connecting said outlet with a receiving tank, a vertical heating tube, the lower end thereof having uninterrupted connection with said receiving tank, a second receiving tank above said heating tube connected to the upper end thereof and a heating jacket for said heating tube, said tube, first receiving tank, and connections being so positioned in relation to said outlet from said vessel as to provide a normal liquid level, at substantially the height of the liquid in the vessel, in said heating tube, so that on heating to thermally pump the solvent into the second receiving tank by means of vapor slugs the back surging of the liquid through the receiver forces material back through the screen, thus clearing the screen.

ORLAND R. SWEENEY.
LIONEL K. ARNOLD.

REFERENCES CITED

The following references are of record in the file of this patent:

UNITED STATES PATENTS

| Number | Name | Date |
|---|---|---|
| 882,322 | Kestner | Mar. 17, 1908 |
| 1,005,733 | Mills | Oct. 10, 1911 |
| 1,831,121 | Kermer | Nov. 10, 1931 |
| 2,273,557 | Bonotto | Feb. 17, 1942 |
| 2,377,135 | Dinley et al. | May 29, 1945 |
| 2,447,845 | Dinley | Aug. 24, 1948 |